US012808622B2

(12) United States Patent
Gearing

(10) Patent No.: US 12,808,622 B2
(45) Date of Patent: Nov. 24, 2026

(54) SHOOTING SUPPORT

(71) Applicant: Spartan Boss Ltd, Horsham (GB)

(72) Inventor: Robert David Gearing, Uckfield (GB)

(73) Assignee: Spartan Boss Ltd, Horsham (GB)

( * ) Notice: Subject to any disclaimer, the term of this patent is extended or adjusted under 35 U.S.C. 154(b) by 28 days.

(21) Appl. No.: 18/656,984

(22) Filed: May 7, 2024

(65) Prior Publication Data

US 2024/0393073 A1 Nov. 28, 2024

(30) Foreign Application Priority Data

May 22, 2023 (GB) ...................................... 2307623

(51) Int. Cl.

| | |
|---|---|
| ***F41A 23/08*** | (2006.01) |
| ***A01M 31/02*** | (2006.01) |
| ***F16M 11/38*** | (2006.01) |
| *G03B 17/56* | (2021.01) |

(52) U.S. Cl.

CPC ............. *F41A 23/08* (2013.01); *A01M 31/02* (2013.01); *F16M 11/38* (2013.01); *G03B 17/561* (2013.01)

(58) Field of Classification Search

CPC ......... A01M 31/02; F41A 23/10; F44A 23/08; F16M 11/22; F16M 11/242; F16M 11/245; F16M 11/38; F16M 11/40; E05D 1/00; E05D 1/02; E05D 9/005

USPC ............... 248/165, 166, 168, 169, 170, 171; 16/221, 225, 239, 255, 277

See application file for complete search history.

(56) References Cited

U.S. PATENT DOCUMENTS

| | | | | |
|---|---|---|---|---|
| 5,074,188 A * | 12/1991 | Harris | F41A 23/08 | 89/37.04 |
| 5,930,933 A * | 8/1999 | Schleicher | F41A 23/16 | 42/94 |
| 2007/0094911 A1* | 5/2007 | Rush | F16M 13/04 | 224/150 |

FOREIGN PATENT DOCUMENTS

| | | |
|---|---|---|
| CN | 206709686 U | 12/2017 |
| WO | WO 2019129336 A1 | 7/2019 |

OTHER PUBLICATIONS

Search Report corresponding to GB Patent Application No. GB2307623.5 dated Oct. 25, 2023 (1 page).

* cited by examiner

*Primary Examiner* — Alfred J Wujciak
(74) *Attorney, Agent, or Firm* — Woodard, Emhardt, Henry, Reeves & Wagner, LLP

(57) ABSTRACT

A shooting support 10 for supporting a firearm 12 is provided. The shooting support 10 comprises two support legs 14, a hinge body 16 interconnecting the two support legs 12, and a support device 18 mounted or mountable on the hinge body 16. The hinge body 16 is articulable in a primary hinge plane to permit a pivoting motion between the two support legs 12 in said primary hinge plane, and the hinge body 16 is further articulable to permit additional movement thereof relative to the two support legs 14.

19 Claims, 12 Drawing Sheets

SHOOTING SUPPORT

CROSS-REFERENCE TO RELATED APPLICATION

This application claims the benefit of Application No. GB2307623.5 filed May 22, 2023, which is hereby incorporated by reference.

BACKGROUND OF THE INVENTION

The present invention relates to a shooting support, or a support for other uses which have similar requirements to shooting, such as photography.

SUMMARY OF THE INVENTION

Shooting sticks are supports for firearms, typically used for supporting a rifle whilst hunting. There are many forms of shooting stick, including bipods, tripods, quad sticks, as well as five-legged variations. There will be at least one support for stabilising the stock of a firearm whilst the hunter prepares to fire. This improves accuracy, resulting in cleaner kills. Similar equipment is used for supporting scopes and binoculars and are also widely used for photography purposes as well.

The shooting sticks provide a wide, splayed base for stability when in use, but are generally easily collapsible into stick form for ease of carrying. Typically, the shooting sticks will include hinges between the legs which are geared in some form, to ease the opening and closing process, and to encourage symmetric opening of the splayed base. One example of such a shooting support is disclosed in WO2019/129336A1.

With such geared constructions, the opening and closing process is very straightforward. However, it presumes the existence of a flat surface on which the hunter can place the shooting support. If the ground is at all uneven, as would commonly be the case in the wilderness, then the entire shooting support will stand at an angle, which does not aid the hunter.

However, a freely hinged support is difficult to control and therefore level, particularly for supports having more than two legs. There will be a natural tendency for the firearm support to cant unexpectedly in this scenario.

The present invention seeks to provide a solution to the above-mentioned problems.

According to a first aspect of the invention, there is provided a shooting support for supporting a firearm, the shooting support comprising: two support legs; a hinge body interconnecting the two support legs; and a support device mounted or mountable on the hinge body; the hinge body being articulable in a primary hinge plane to permit a pivoting motion between the two support legs in said primary hinge plane; and the hinge body being further articulable to permit additional movement thereof relative to the two support legs.

A shooting support having at least one hinge where there is a primary hinging action and a degree of tolerance inbuilt which allows for further different articulation or movement to be achieved enables a greater case of positioning of the shooting support in uneven terrain. This provides the hunter with the ability to set up a stable shooting position in a wider range of locations when stalking.

The shooting support optionally further comprises a further support leg pivotably engaged with the hinge body.

A tripod arrangement may have an improved stability when compared with a bipod.

Preferably, the shooting support may further comprise two further support legs, a further hinge body interconnecting the two support legs, and a further support device mounted or mountable on the further hinge body, and further comprising a left-hand connection hinge body pivotably engaging one of the support legs with one of the further support legs, and a right-hand connection hinge body pivotably engaging the other of the support legs with the other of the further support legs.

A four-legged support has the advantage of providing both front and rear support for a firearm, typically being most suitable for long-barrelled rifle shooting, resulting in more accurate shooting.

Optionally, the left- and right-hand connection hinge bodies are articulable in respective connection hinge planes to permit a pivoting motion between the respective support leg and further support leg in said connection hinge planes, and the left- and right-hand connection hinge bodies being further articulable to permit movement of a ground-contact portion of the left- and right-hand connection hinge bodies relative to the respective support leg and further support leg.

Having articulation at the ground support portion of the shooting support allows for compensatory movement to be achieved at the base of the apparatus, thereby accounting for sticks, stones, or other debris that may be present without needing to alter the telescoping position of the support legs.

Preferably, the hinge body, the further hinge body, the left-hand connection hinge body, and the right-hand connection hinge body may be independently articulable from one another.

Independent articulation allows for different support legs to be moved relative to one another to compensate for uneven footing more easily.

In a preferable embodiment, the hinge body may be formed from a resiliently flexible material.

A resiliently flexible material, such as natural or synthetic rubber, is compressible, deformable, twistable, and pivotable, and therefore contains a lot of tolerance within the shooting stand to compensate for uneven ground.

Optionally, the hinge body may comprise an elongate core of a stressed material. Preferably, the elongate core of a stressed material may be a bent wire portion, which may preferably form an internal spring.

A core of the resiliently flexible material will be able to return the hinge body to a default position. This assists with retrieving the shooting support from the open position to a closed or collapsed position, where standard supports may collapse in an uncontrolled manner. The core is also sufficiently flexible to permit movements out of the primary hinge plane.

In an alternative preferable embodiment, the hinge body may comprise a hinge body member having a pair of independently articulable joints. The pair of independently articulable joints may be universal ball joints.

It may be possible to achieve similar results to the resiliently flexible arrangement by using independent articulation, where the independent joints do not solely move in the primary hinge plane. Ball joints are suitable for this purpose.

Optionally, the two support legs may be releasably engageable with the hinge body. Preferably, the support device may be receivably engagable with the hinge body.

It is preferred that the hinge body be made as a separate independent component, which will allow existing support legs and/or support devices to be retrofitted to the hinge body and make use of the benefits resulting therefrom.

Optionally, the hinge body may comprise a receiver for engaging with a complementary fastener.

The receiver for a fastener may allow for support devices having different types of connectors to be incorporated, with the fastener acting as an adapter component.

The hinge body may be further articulable out of the primary hinge plane.

Movement out of the primary hinge plane is the primary mechanism by which compensation for uneven terrain can be achieved, as the support legs can thus be manipulated to avoid ground level obstacles.

Additionally, or alternatively, the hinge body may be at least in part deformable.

Deformation of the hinge body itself may allow for compensation for obstacles onto which the hinge body is positioned when at ground level or may even allow for canting of the firearm if necessary.

Preferably, the hinge body may be at least in part twistable out of the primary hinge plane.

Twisting actions are useful for shifting the positions of support legs sufficiently to permit avoidance of obstacles, and to also align the upper hinges when ground-level repositioning has been necessary.

Optionally, the hinge body may be configured to return to a default hinge position in the absence of an external force.

If the shooting support has a default hinge position somewhere between a fully splayed and a closed position, it will require relatively little force on the part of the user to either open or close. Often, shooting sticks are either cumbersome to open or to close.

According to a second aspect of the invention, there is provided a support stand for a portable aiming device, the support stand comprising: two support legs; a hinge body interconnecting the two support legs; and a support device mounted or mountable on the hinge body; the hinge body being resiliently flexible to permit hinging in at least a primary hinge plane thereof.

It is clear that the present invention could be used with many different types of devices, not merely firearms, where a ground-support is required that must compensate for uneven terrain.

Preferably, the support device may be a support for at least one of: a firearm; binoculars; a scope; or photography equipment.

According to a third aspect of the invention, there is provided a shooting support for supporting a firearm, the shooting support comprising: a front pair of support legs; a front hinge body interconnecting the front pair of support legs; a front support device mounted or mountable on the front hinge body; a rear pair of support legs; a rear hinge body interconnecting the rear pair of support legs; a rear support device mounted or mountable on the rear hinge body; left- and right-hand connection hinge bodies respectively interconnecting the front pair of support legs and the rear pair of support legs; the front hinge body being articulable in a front hinge plane to permit a pivoting motion between the front pair of support legs in said front hinge plane, the rear hinge body being articulable in a rear hinge plane to permit a pivoting motion between the rear pair of support legs in said rear hinge plane, and the left- and right-hand connection hinge bodies respectively being articulable in left-hand and right-hand hinge planes to permit a pivoting motion between the front pair of support legs and the rear pair of support legs; and at least one of the front hinge body, the rear hinge body, the left-hand connection hinge body, and the right-hand connection hinge body being further articulable to permit in-use adjustment of an alignment of a firearm supported on the front and rear support devices.

The four-legged shooting support has the advantage of the full frame of the support legs being connected using the articulable hinges, and therefore complete adjustability at all four corners of the apparatus is achievable.

According to a fourth aspect of the invention, there is provided a support, preferably for supporting a firearm, the support comprising: two support legs; and a hinge body interconnecting the two support legs; the hinge body being articulable in a primary hinge plane to permit a pivoting motion between the two support legs in said primary hinge plane; and the hinge body being further articulable to permit movement thereof relative to the two support legs.

According to a fifth aspect of the invention, there is provided a support, preferably for supporting a firearm, the support comprising: two support legs; and a hinge body interconnecting the two support legs; the hinge body being movable in a primary hinge plane to permit a pivoting motion between the two support legs in said primary hinge plane; and the hinge body being further movable, twistable, pivotable and/or deformable to permit movement thereof relative to the two support legs.

According to a sixth aspect of the invention, there is provided a shooting support having a plurality of support legs and at least one hinge interconnecting adjacent legs to permit additional movement other than a primary hinging action of the at least one hinge.

BRIEF DESCRIPTION OF THE DRAWINGS

The invention will now be more particularly described, by way of example only, with reference to the accompanying drawings, in which.

DETAILED DESCRIPTION OF THE INVENTION

Figure 1:
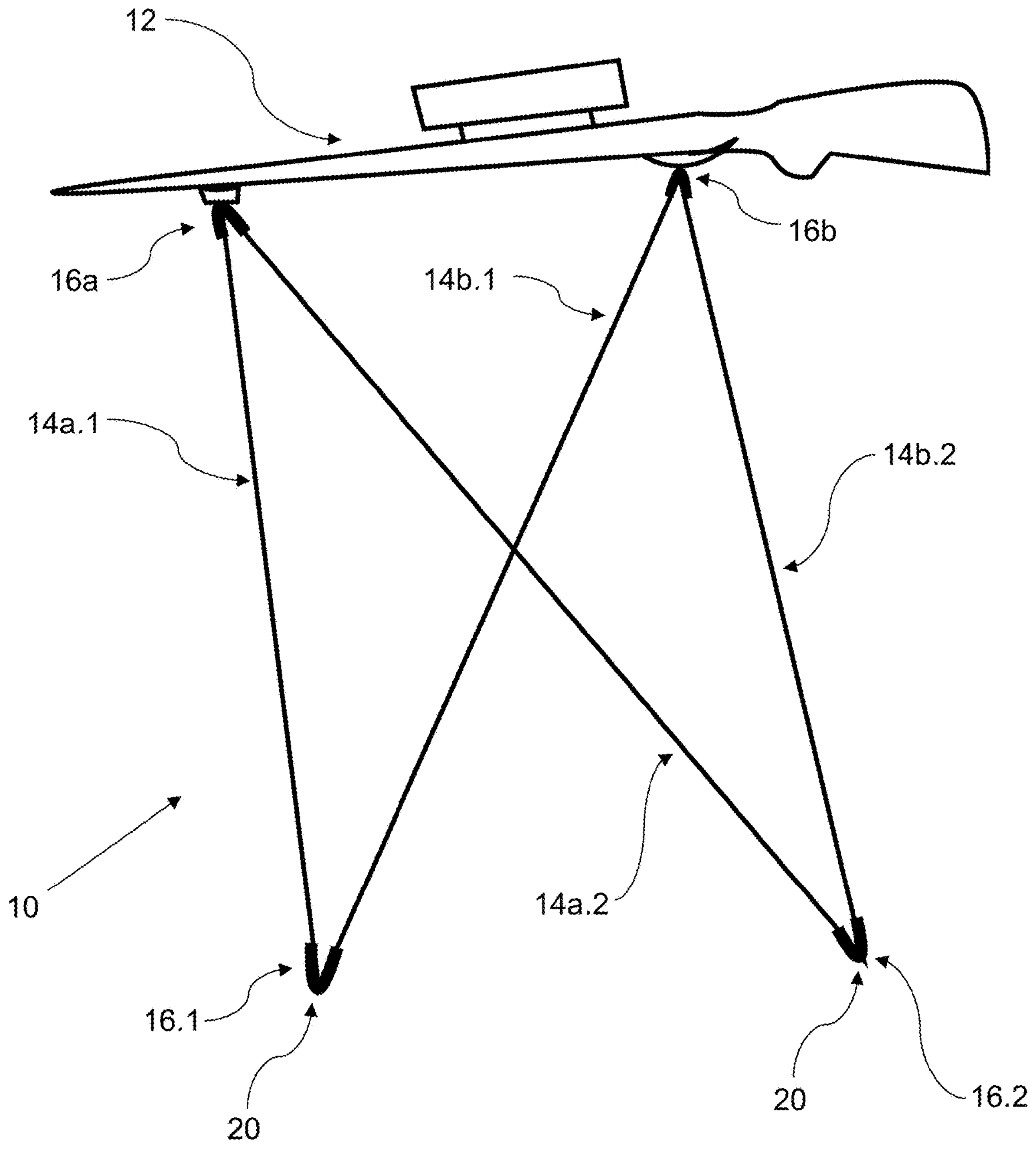
FIG. 1 shows a pictorial representation from the side of a firearm supported by a first embodiment of a shooting support in accordance with the first aspect of the invention.

Referring to FIG. 1 there is shown a shooting support, referenced globally at 10, and which is designed for supporting the stock and barrel of a firearm, such as a rifle 12, typically during stalking and hunting activities. It will be appreciated that the shooting support 10 could be readily adapted for use with other aimable devices, such as scopes, binoculars, or photographic equipment, and it will be apparent that the present invention is not limited to shooting sticks.

Figure 2:
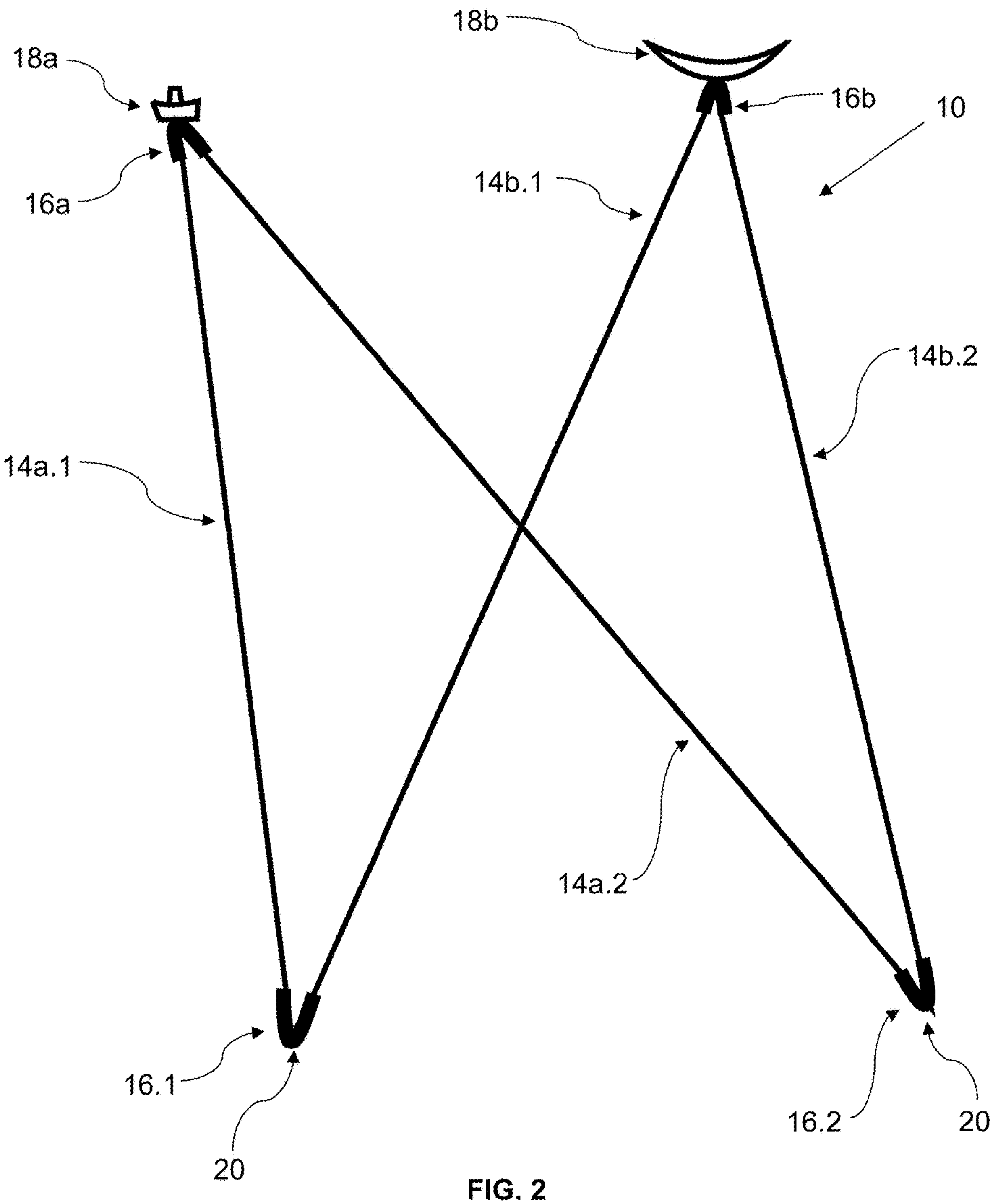
FIG. 2 shows a pictorial representation from the side of the shooting support of FIG. 1.
Figure 3:
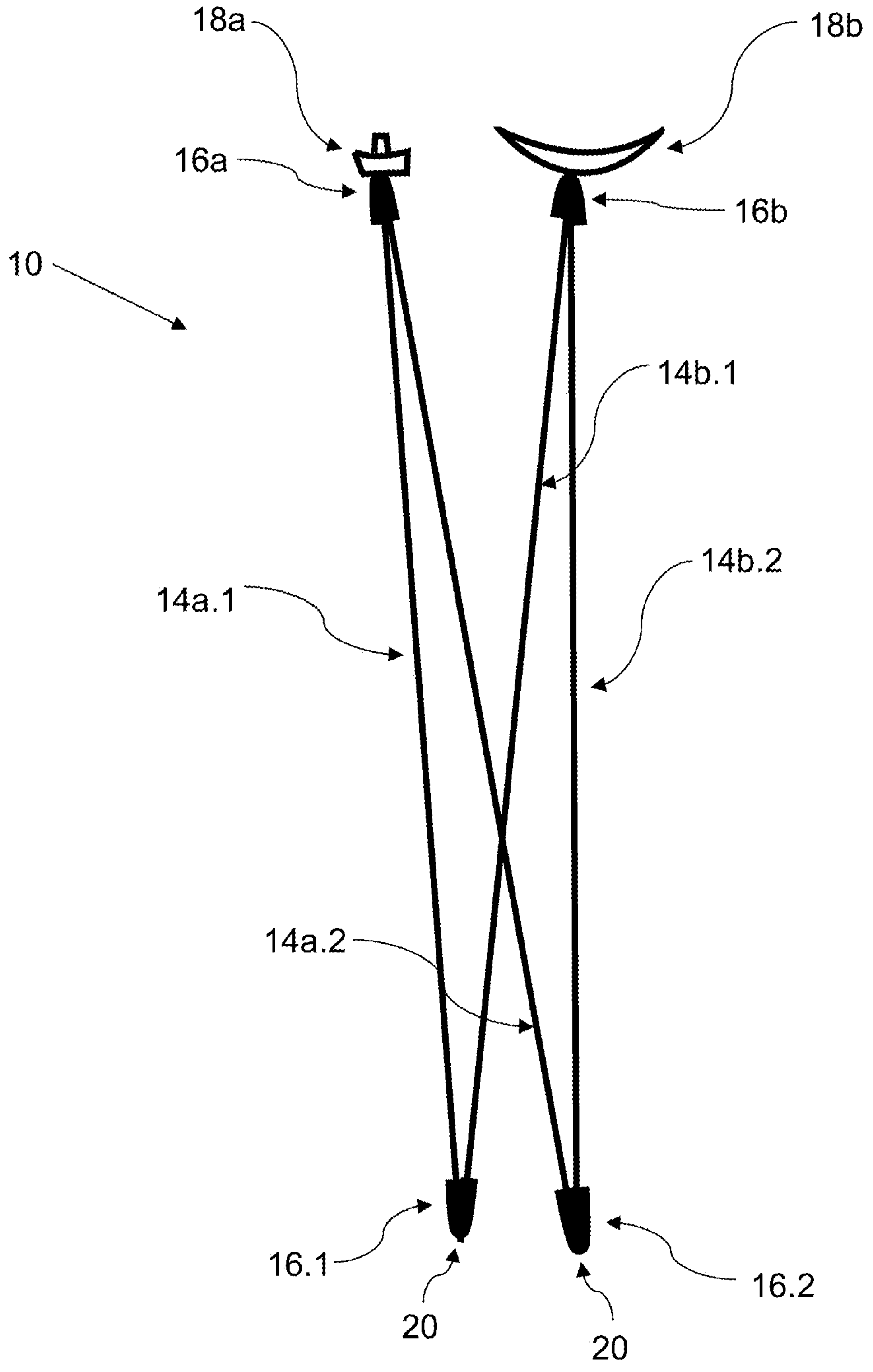
FIG. 3 shows a pictorial representation of the shooting support of FIG. 2 in a part-collapsed condition.

In the depicted embodiment, and as also shown in FIGS. 2 and 3, the shooting support 10 comprises two pairs of legs. There is a front pair of support legs 14*a*.1, 14*a*.2 and a rear pair of support legs 14*b*.1, 14*b*.2.

The front pair of support legs 14*a*. 1, 14*a*.2 is connected at a front hinge body 16*a*, upon which is provided a front support device 18*a*, and the rear pair of support legs 14*b*.1, 14*b*.2 is connected at a rear hinge body 16*b*, upon which is provided a rear support device 18*b*.

The front pair of support legs 14*a*. 1, 14*a*.2 effectively forms a forward bipod, and the rear pair of support legs 14*b*.1, 14*b*.2 forms a rearward bipod. The forward and rearward bipods are, however, interconnected at left-hand and right-hand connection hinge bodies 16.1, 16.2 respectively, thereby forming the distinctive tetrahedral shape of the shooting support 10. The left-hand and right-hand connection hinge bodies 16.1, 16.2 have ground contact portions 20 via which the shooting support 10 contacts the ground.

Each of the support legs 14*a*.1, 14*a*.2, 14*b*.1, 14*b*.2 is preferably formed as a telescopic leg, to allow for height adjustability of the entire shooting support 10. This is preferably independent telescopic action.

The front support device 18*a*, illustrated in FIGS. 2 and 3 in particular, may be releasably engagable with the front hinge body 16*a*, and may be a magnetic connection device receivably engagable with a stock of a complementary firearm. Alternatively, a conventional seat for the stock could be provided. The rear support device 18*b* is indicated as such a conventional seat.

FIGS. 1 and 2 show the shooting support 10 in the open or in-use configuration, with the front and rear support devices 18*a*, 18*b* being spaced apart from one another to form a linear rest for the firearm 12. FIG. 3 shows a part-collapsed configuration, on the way to forming the fully stick-like collapsed state.

Figure 4:
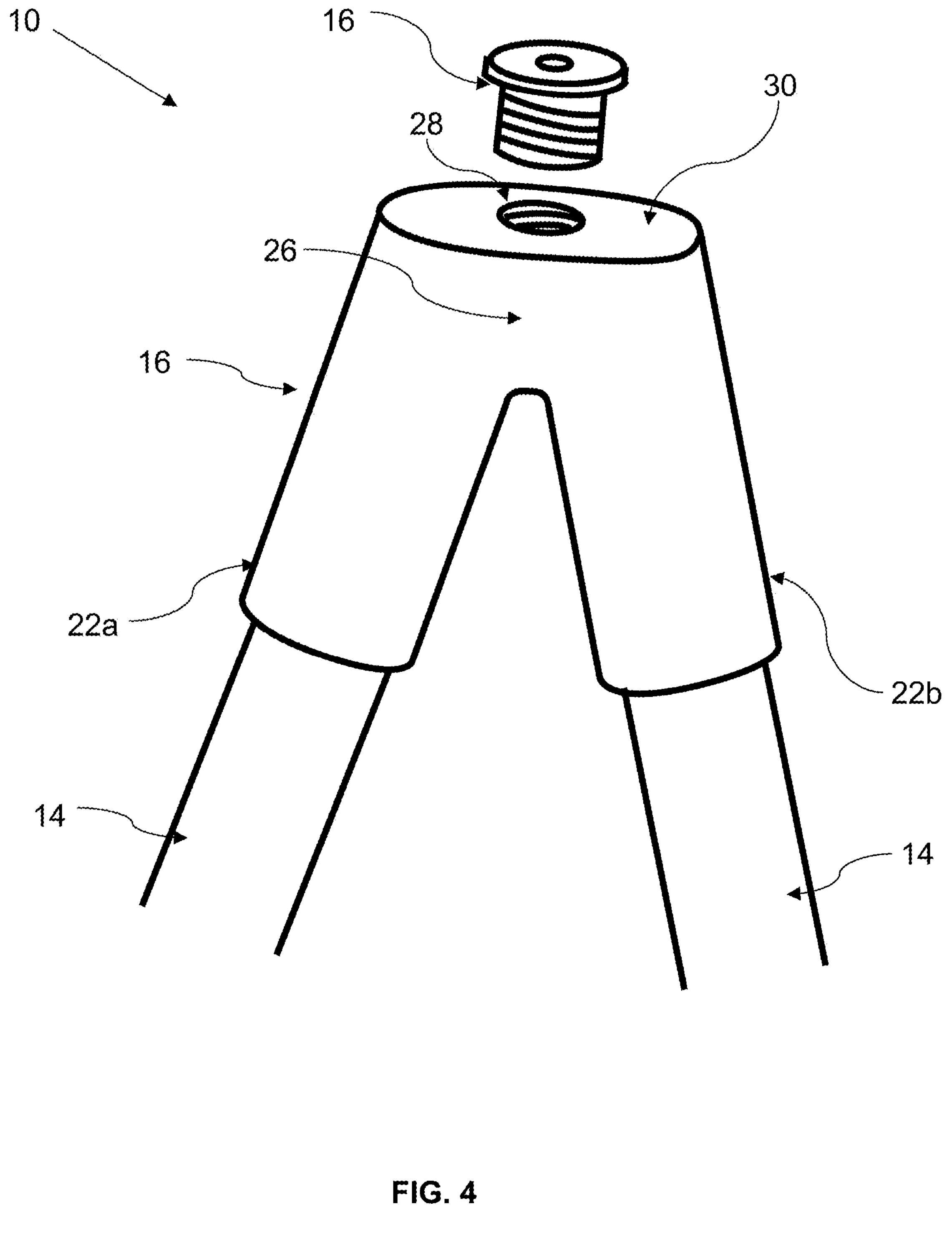
FIG. 4 shows a perspective representation of a hinge body of the shooting support of FIG. 1, with the support legs shown in part only.

FIG. 4 shows an example of one of the hinge bodies. This could be any of the front hinge body 16*a*, rear hinge body 16*b*, left-hand connection hinge body 16.1, or right-hand connection hinge body 16.2, and hereafter, the hinge bodies will be described in general terms as hinge body 16.

Figure 5:
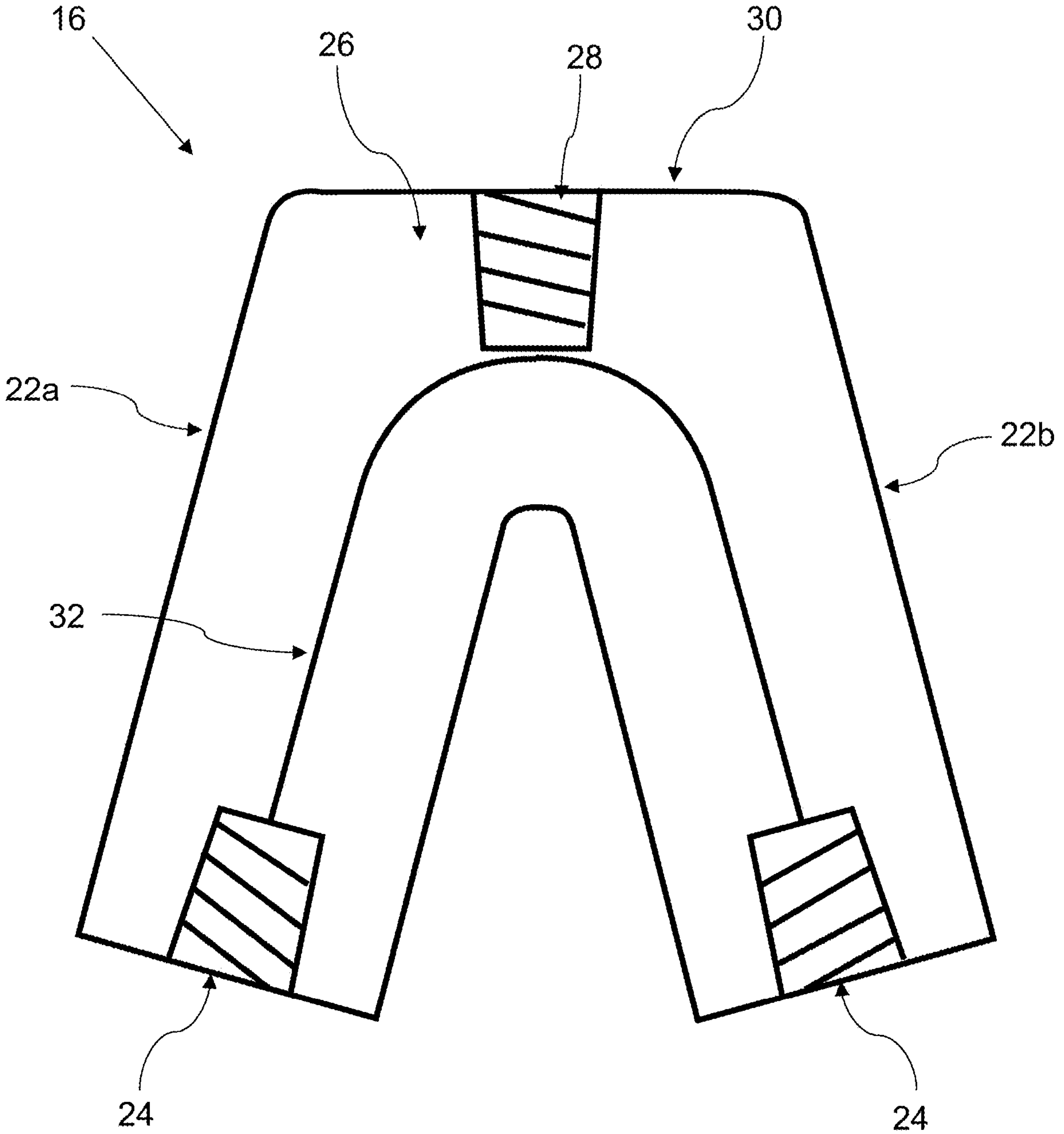
FIG. 5 shows a cross-sectional representation of the hinge body of FIG. 4 taken through a primary hinge plane thereof.

The hinge body 16 is formed, at least in part, from a resiliently flexible material, and is shaped so as to have a first side portion 22*a* and a second side portion 22*b* which are respectively engagable with adjacent support legs 14. As can be seen from the cross-section of the hinge body 16 shown in FIG. 5, the support legs 14 are releasably engagable with the respective first and second side portions 22*a*, 22*b* via leg receivers 24. The leg receivers 24 here are screw-threaded receivers, though it will be apparent that other types of connector could be considered, for instance, bayonet type fittings.

A bridge portion 26 of the hinge body 16 is provided which interconnects the first and second side portions 22*a*, 22*b*. The bridge portion 26 has a flat or substantially flat side 28 on an opposite side to the leg receivers 24, into which there is a receiver 30 for engaging with a support device. In FIG. 4, this is indicated as a screw-threaded receiver, and a complementary fastener 32 engagable with a support device is illustrated. As with the leg receivers 24, alternative connection means are available. The leg receivers 24 and the said receiver 30 are here formed as hexagonal components which are embedded into the hinge body 16, and which have an internal screw thread.

The flat side 28 of the hinge body 16 not only provides a suitable abutment surface against which a support device 18 can be positioned, but also acts as the ground contact portion 20 if the hinge body 16 is in an inverted state, that is, for example, acting as the left-hand and right-hand connection hinge bodies 16.1, 16.2 of FIGS. 1 to 3.

Internal to the hinge body 16 there may be provided an elongate core of a stressed material, here shown as a bent wire 32, which interconnects the first and second side portions 22*a*, 22*b*, and provides some base hinging action for the hinge body 16. The form of the hinge body 16, however, having a substantially U-shaped or V-shaped profile into which the bent wire 32 is embedded, prevents full unflexing of the bent wire 32. Of course, flexion could be provided completely by the inherent flexibility or resilience of the hinge body 16.

Figure 6:
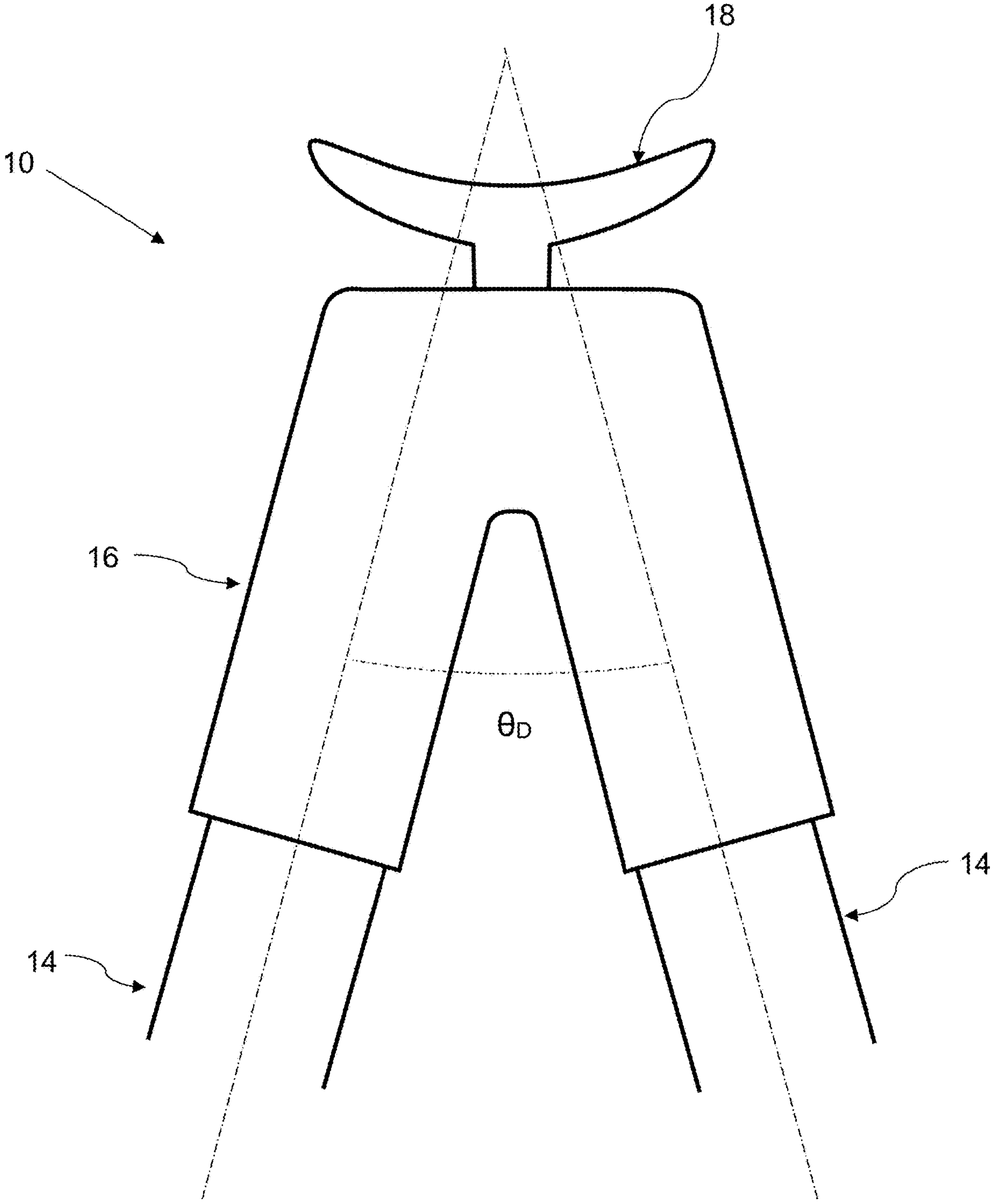
FIG. 6 shows a front view of the hinge body of FIG. 4, in conjunction with a support device.

FIG. 6 shows the default position of the hinge body 16. A support device 18 is shown for completeness onto which a firearm could be rested. The support legs 14 are positioned at an angle θD relative to one another in a primary hinge plane containing the primary axes of both support legs 14, and this default position is defined by the shape of the hinge body 16 as originally formed. This is equivalent to the angular position of the shooting support 10 of FIG. 2.

Figure 7:
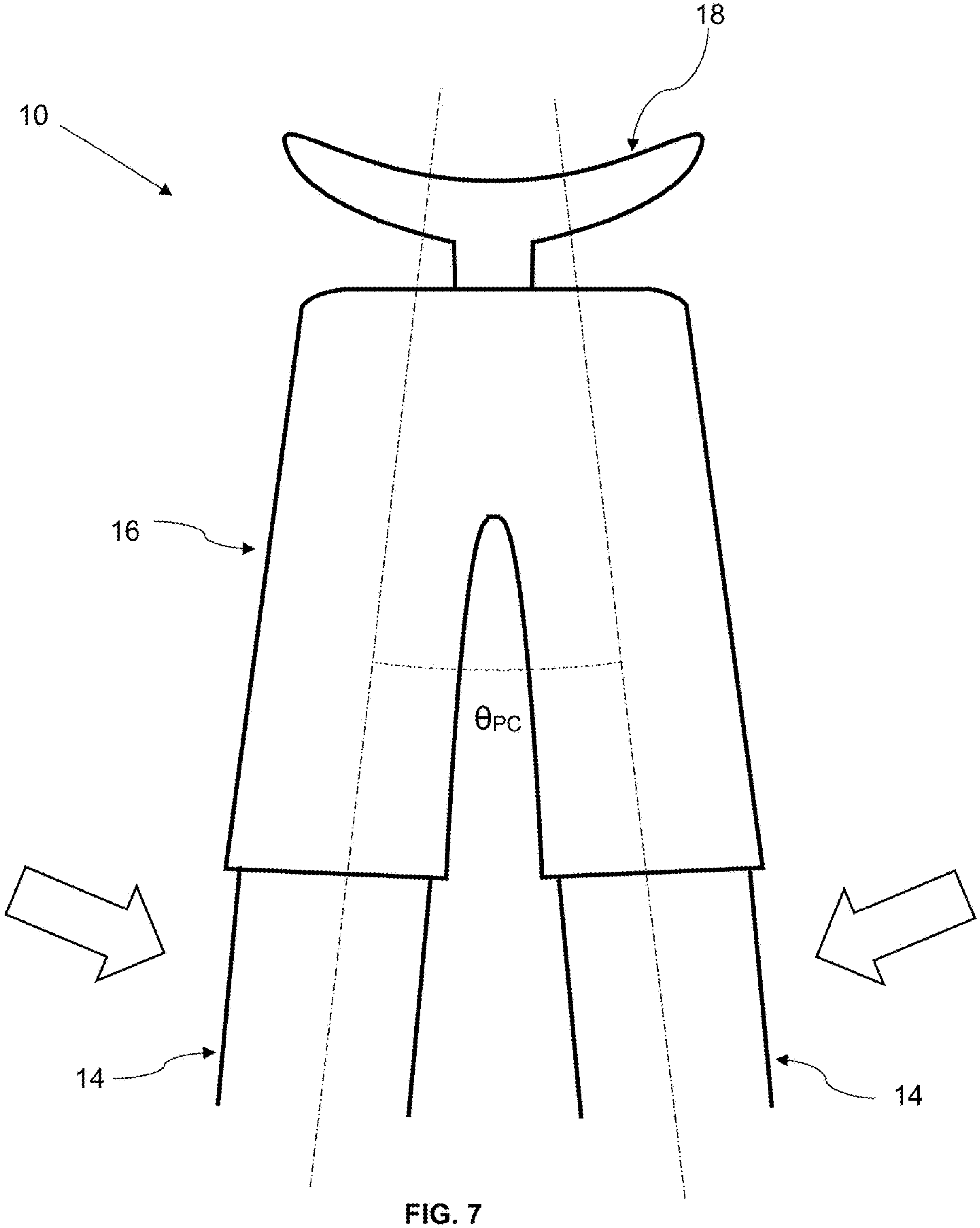
FIG. 7 shows a front view of the hinge body of FIG. 6, following a pivoting of the support legs in the primary hinge plane.

FIG. 7 shows a part closed position of the hinge body 16. The support legs 14 are positioned at an angle θPC relative to one another in the primary hinge plane, and this angle is less than angle θD. The hinging is performed due to flexion of the hinge body 16, allowing the first and second side portions 22*a*, 22*b* to move towards one another. Indeed, in this manner, the resiliently flexible hinge can be considered to be joint-less, in that it is not made of multiple separate component parts which fully move relative to one another.

It will be apparent that the reverse process is feasible to splay the support legs 14 relative to one another, flexing the first and second side portions 22*a*, 22*b* away from one another so that the support legs 14 are positioned at an angle greater than angle θD.

Figure 8:
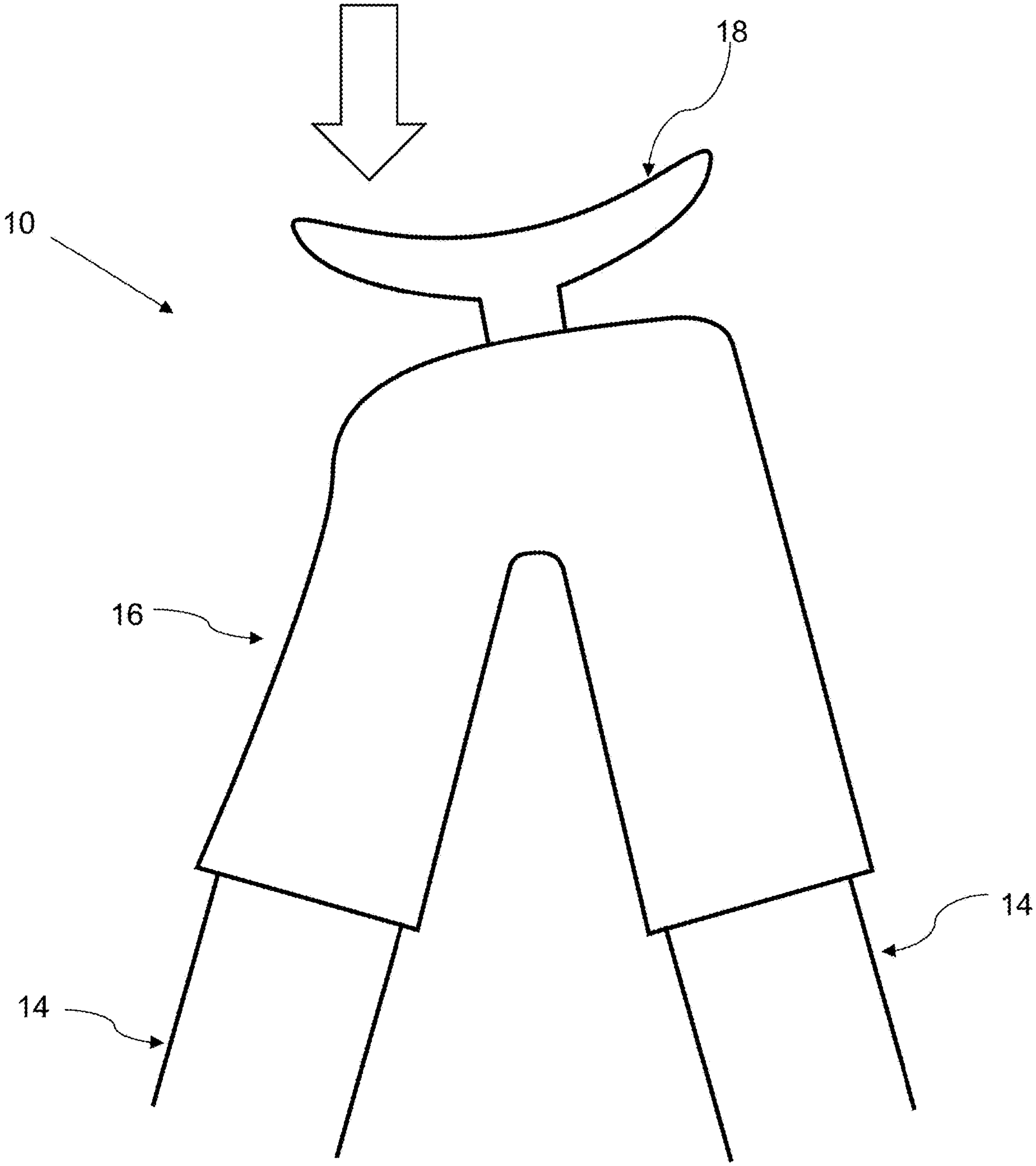
FIG. 8 shows a front view of the hinge body of FIG. 6, following a canting action to deform the hinge body.

FIG. 8 shows the deformability of the hinge body 16. Since the hinge body 16 is formed from rubber or a similarly resiliently flexible material, application of a force may cause deformation allowing for a change in shape or orientation. Here, application of a force at the support device 18 causes a canting of the hinge body 16 and by extension the support device 18.

This may not seem particularly useful for a hinge body 16 at an upper end of the shooting support 10, where stability is crucial for aiming of a firearm, but the deformability may be more useful in accommodating for uneven ground at the lower end of the shooting support 10.

Figure 9:
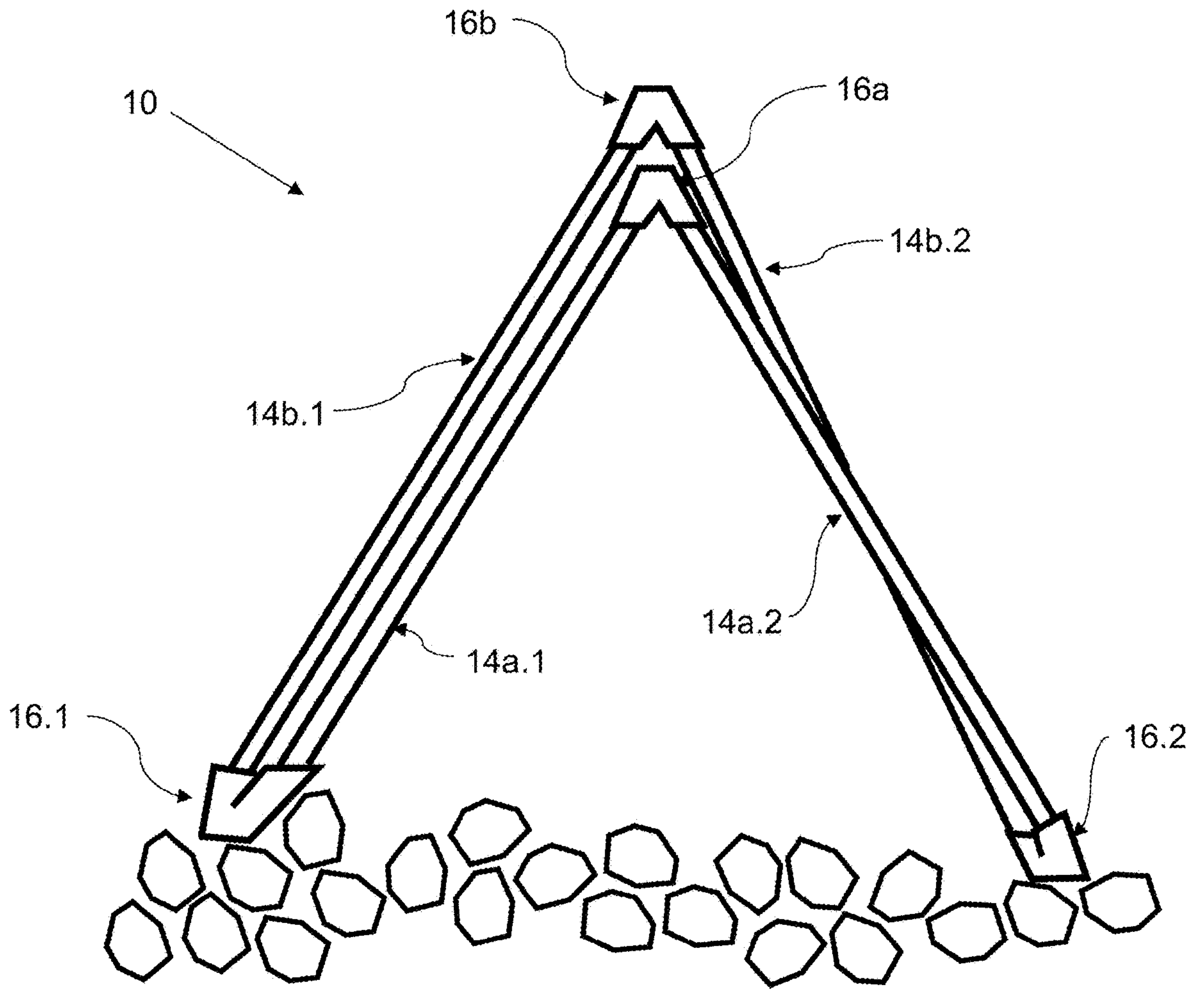
FIG. 9 shows a pictorial representation from the front of the shooting support of FIG. 2, indicating a twisting movement of the left- and right-hand connection hinge bodies to accommodate for uneven ground.

This is indicated in more detail in FIG. 9. The support devices are omitted for clarity. The front hinge body 16*a* and rear hinge body 16*b* are in the default orientation, which is adapted to support a firearm in use.

However, the left-hand connection hinge body 16.1 and right-hand connection hinge body 16.2 are deformed or twisted to accommodate for the uneven ground (n20). Forces can be applied to the left-hand connection hinge body 16.1 and right-hand connection hinge body 16.2 so that the shooting support 10 as a whole is not symmetric, which allows for use in non-flat environments as would be encountered in the wilderness. This allows for uneven terrain to be compensated for without necessarily altering the telescoping of the support legs 14*a*.1, 14*a*.2, 14*b*.1, 14*b*.2, which can be a time-consuming process.

One of the advantages of the shooting support 10 as illustrated is that the hinge bodies 16*a*, 16*b*, 16.1, 16.2 are sufficiently resiliently flexible to counteract gravity if held aloft. There is a natural springiness to the shooting support 10 which makes it both easy to splay, and easy to close, since the default position is somewhere between the two positions. For example, if a user held the shooting support 10 by the rear pair of support legs 14*b*.1, 14*b*.2 only, then the front pair of support legs 14*a*.1, 14*a*.2 would not just collapse forward.

To use the shooting support 10, a hunter would deploy it so that the front pair of support legs 14*a*.1, 14*a*.2 leaned forwards, and the rear pair of support legs 14*b*.1, 14*b*.2, with the left-hand connection hinge body 16.1 and right-hand connection hinge body 16.2 being splayed apart from one another to form a stable base. Adjustment of one or more of the hinge bodies 16*a*, 16*b*, 16.1, 16.2 could then be performed by twisting, pivoting, deforming, or otherwise articulating the hinge body 16*a*, 16*b*, 16.1, 16.2 itself to ensure that a stable shooting position can be achieved regardless of the level or form of the ground on which the shooting support 10 is positioned. This significantly increases the utility of the shooting support 10 for wilderness activities.

Figure 10:
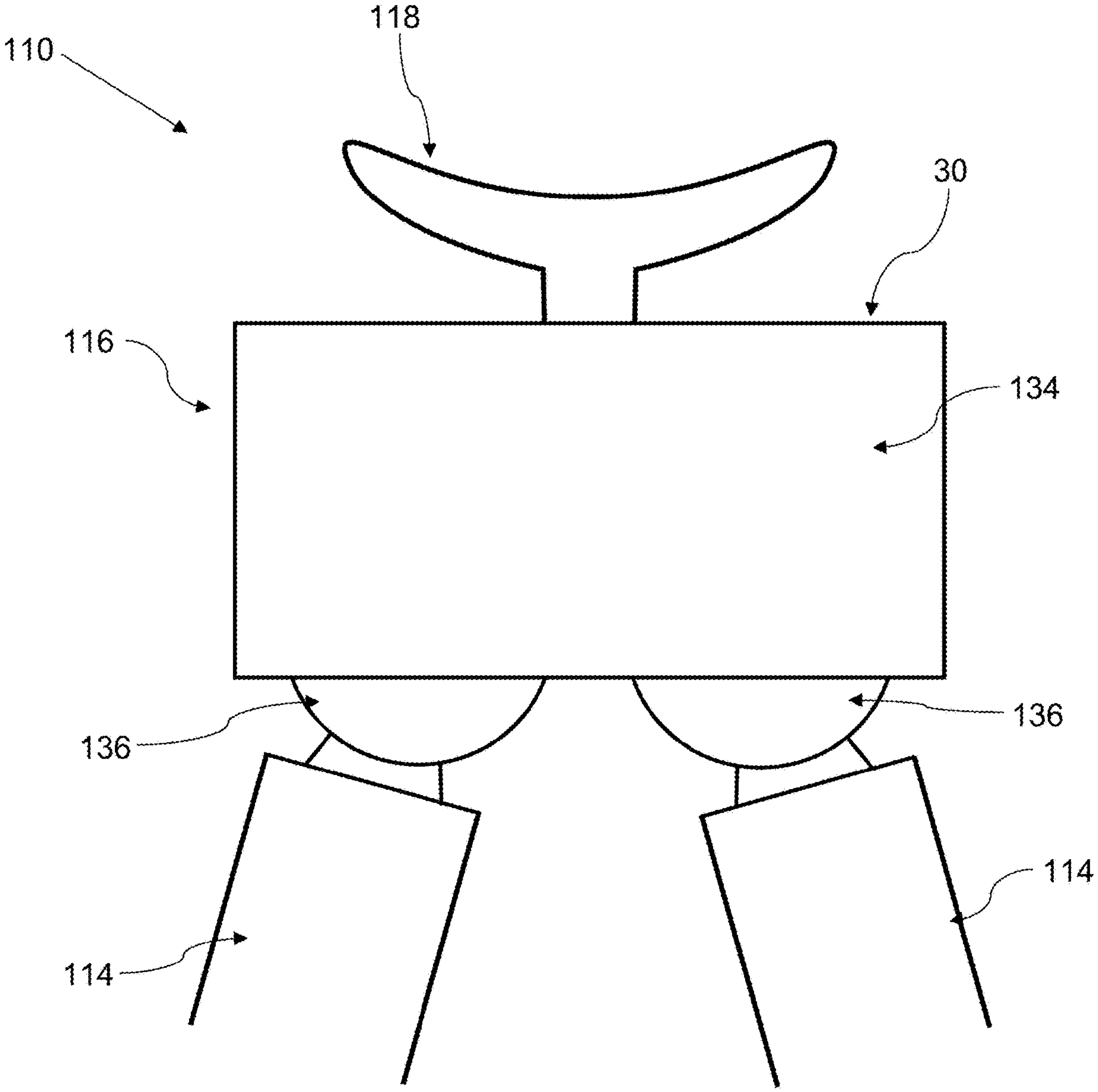
FIG. 10 shows a front view of a hinge body of a second embodiment of a shooting support in accordance with the first aspect of the invention.

An alternative embodiment of shooting support, referenced globally at 110, is illustrated in FIG. 10. Identical or similar features to those described in relation to the first embodiment will be referenced using identical or similar reference numerals, and further detailed description is omitted for brevity.

The hinge body 116 comprises a rigid member 134 having a part of articulable ball joints 136 engaged therewith. This could be achieved by having captive balls within the rigid member 134, the balls being engaged with respective support legs 114. The support device 118 can then be engaged on the flat side 130 of the rigid member 134.

Such an alternative hinge body 116 has the advantage of being able to provide a similar range of movement to the resiliently flexible hinge, and may perhaps require less force to alter the position thereof. It may be necessary to make the articulable ball joints 136 relatively stiff to avoid collapse of the shooting support 110 under the weight of a firearm.

Figure 11:
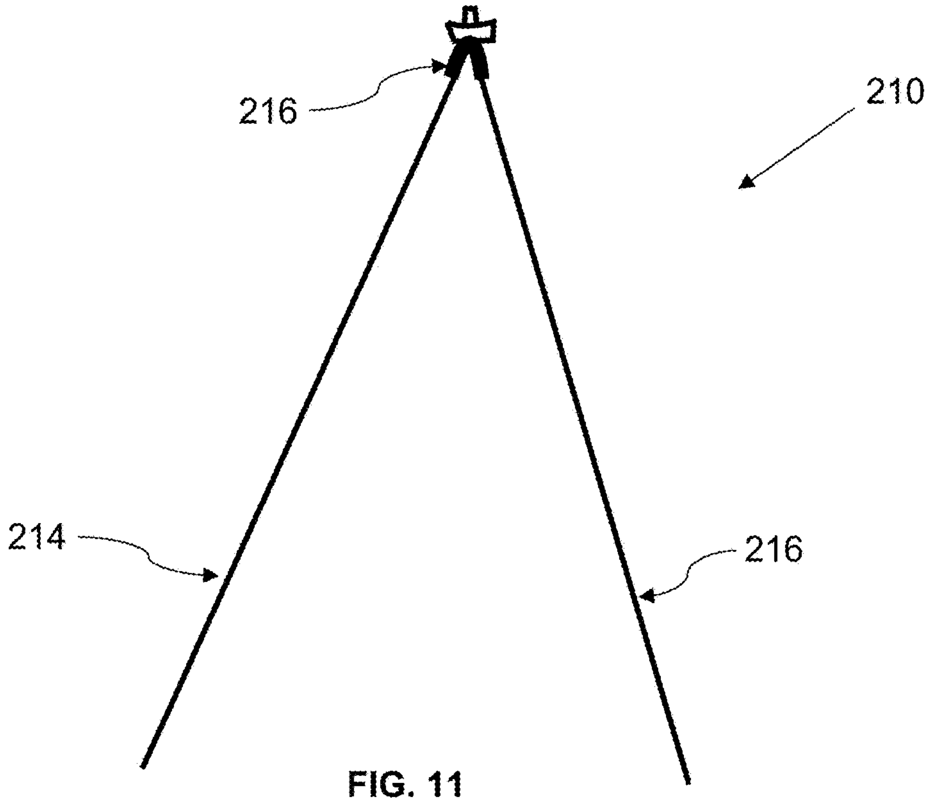
FIG. 11 shows a pictorial representation from the side of a third embodiment of a shooting support in accordance with the first aspect of the invention.
Figure 12:
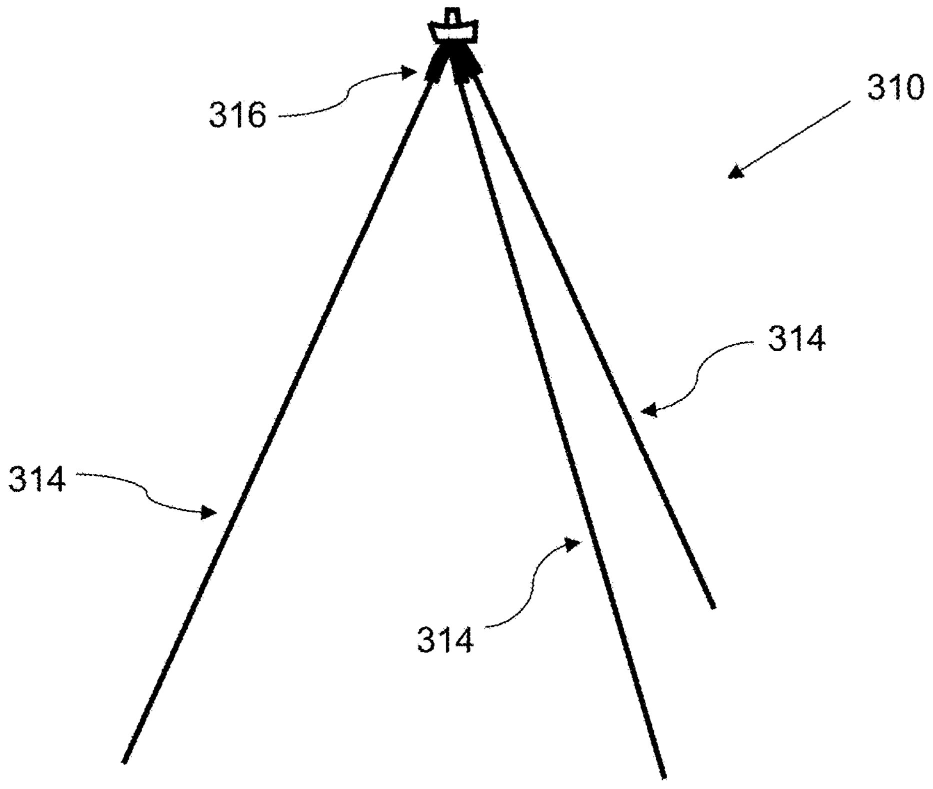
FIG. 12 shows a pictorial representation from the side of a fourth embodiment of a shooting support in accordance with the first aspect of the invention.
Figure 13:
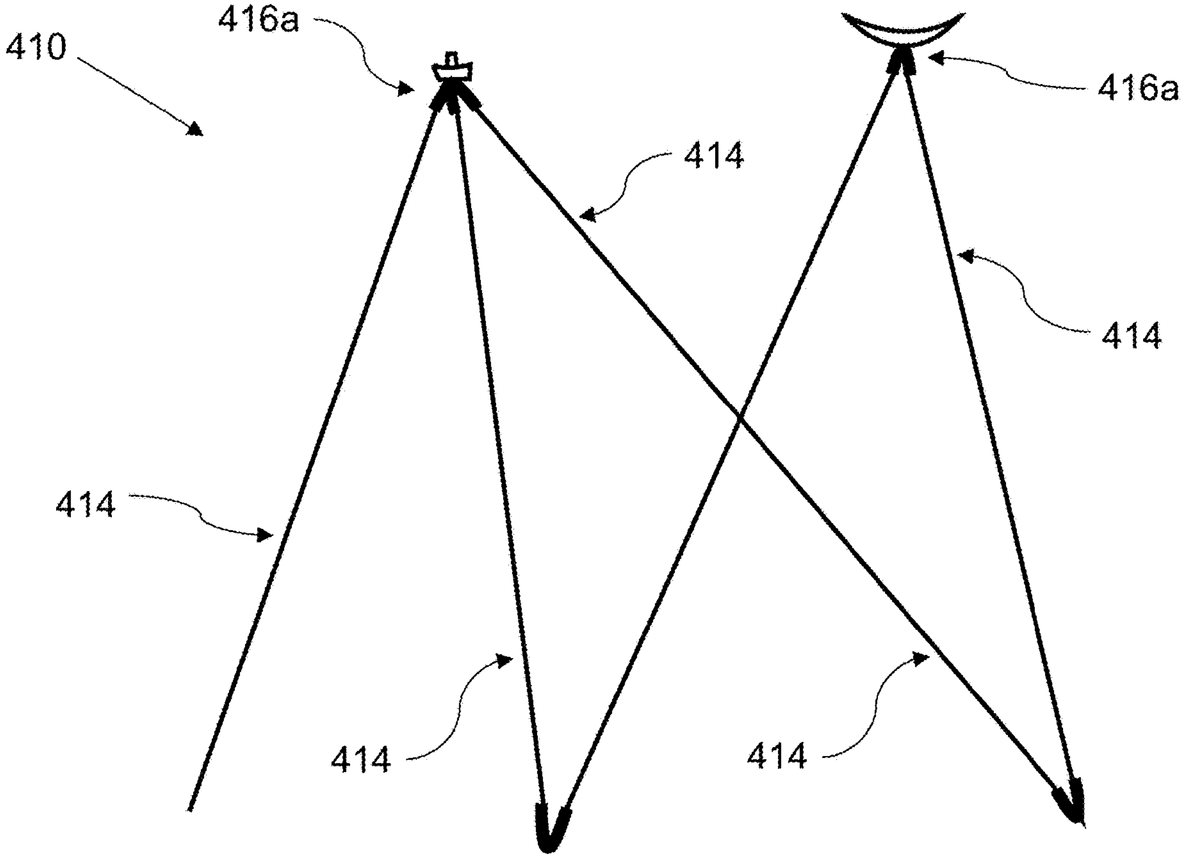
FIG. 13 shows a pictorial representation from the side of a fifth embodiment of a shooting support in accordance with the first aspect of the invention.

FIGS. 11 to 13 show alternative embodiments of shooting supports, respectively referenced at 210, 310, and 410. These are a bipod, tripod, and five-legged arrangement respectively.

The hinge body 216 of the bipod arrangement is similar to either of the front hinge body 16*a* and rear hinge body 16*b* of the first embodiment, and is connected to respective support legs 214.

The hinge body 316 of the tripod, on the other hand, is a three-legged hinge having three side portions. As such, there may be a hinge plane between each adjacent pair of support legs 314, but also potentially hinge planes which extend towards the centre of the hinge body 316 through each side portion respectively for collapsing the shooting support 310.

For the five-legged embodiment of shooting support 410, the front hinge body 416*a* is converted from a two-legged to a three-legged hinge, and the front pair of support legs 414 instead becomes a front tripod, when compared with the shooting support 10 of the first embodiment. The rear pair of support legs 414 is otherwise identical to that of the first embodiment, having its own rear hinge body 416*b*.

It is therefore possible to provide a support for a portable aiming device, preferably a shooting support, which has hinges which allow for a greater range of movement than standard geared hinges which are typically used for such supports. This allows for compensation for uneven terrain to be achieved in-use, increasing the utility of the apparatus.

The words 'comprises/comprising' and the words 'having/including' when used herein with reference to the present invention are used to specify the presence of stated features, integers, steps, or components, but do not preclude the presence or addition of one or more other features, integers, steps, components, or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

The invention claimed is:

1. A shooting support for supporting a firearm, the shooting support comprising:

first and second support legs;

a hinge body having a first side portion and a second side portion respectively interconnecting the first and second support legs; and a support device mounted or mountable on the hinge body for supporting the firearm;

the hinge body being resiliently flexible to permit hinging in at least a primary hinge plane thereof and allow the first side portion and the second side portion to move relative to one another;

wherein the hinge body is configurable from a first configuration for supporting the firearm to a second configuration for supporting the firearm;

wherein in the first configuration, the first and second support legs are positioned at a first angle relative to one another when supporting the firearm;

wherein in the second configuration the first and second support legs are positioned at a second angle relative to one another when supporting the firearm; and wherein the second angle is less than the first angle.

2. A shooting support as claimed in claim 1, further comprising a further support leg pivotably engaged with the hinge body.

3. A shooting support as claimed in claim 1, further comprising two further support legs, a further hinge body interconnecting the two further support legs, and a further support device mounted or mountable on the further hinge body, and further comprising a left-hand connection hinge body pivotably engaging one of the support legs with one of the further support legs, and a right-hand connection hinge body pivotably engaging the other of the support legs with the other of the further support legs.

4. A shooting support as claimed in claim 3, wherein the left-and right-hand connection hinge bodies are articulable in respective connection hinge planes to permit a pivoting motion between the respective support leg and further support leg in said connection hinge planes, and the left-and right-hand connection hinge bodies being further articulable to permit movement of a ground-contact portion of the left-and right-hand connection hinge bodies relative to the respective support leg and further support leg.

5. A shooting support as claimed in claim 4, wherein the hinge body, the further hinge body, the left-hand connection hinge body, and the right-hand connection hinge body are independently articulable from one another.

6. A shooting support as claimed in claim 1, wherein the hinge body comprises an elongate core of a stressed material.

7. A shooting support as claimed in claim 6, wherein the elongate core of a stressed material is a bent wire portion.

8. A shooting support as claimed in claim 1, wherein the first and second support legs are releasably engageable with the hinge body.

9. A shooting support as claimed in claim 1, wherein the support device is receivably engageable with the hinge body.

10. A shooting support as claimed in claim 1, wherein the hinge body comprises a receiver for engaging with a complementary fastener.

11. A shooting support as claimed in claim 1, wherein the hinge body is further articulable out of the primary hinge plane.

12. A shooting support as claimed in claim 1, wherein the hinge body is at least in part deformable.

13. A shooting support as claimed in claim 1, wherein the hinge body is at least in part twistable out of the primary hinge plane.

14. A shooting support as claimed in claim 1, wherein the hinge body is configured to return to a default hinge position in the absence of an external force.

15. A shooting support as claimed in claim 1, wherein the support device is a support for at least one of: a firearm; binoculars; a scope; or photography equipment.

16. A hinge for a shooting support for supporting a firearm, the hinge comprising:

a hinge body having a first side portion and a second side portion respectively interconnecting support legs of a shooting support; and a support device mounted or mountable on the hinge body for supporting the firearm;

the hinge body being resiliently flexible to permit hinging in at least a primary hinge plane thereof and allow the first side portion and the second side portion to move relative to one another;

wherein the hinge body is configurable from a first configuration for supporting the firearm to a second configuration for supporting the firearm;

wherein in the first configuration, the first and second side portions are positioned at a first angle relative to one another when supporting the firearm;

wherein in the second configuration the first and second side portions are positioned at a second angle relative to one another when supporting the firearm; and wherein the second angle is less than the first angle.

17. A shooting support for supporting a firearm, the shooting support comprising:

two support legs;

a hinge body interconnecting the two support legs; and a support device mounted or mountable on the hinge body for supporting the firearm;

the hinge body being resiliently flexible to permit hinging in at least a primary hinge plane thereof; and two further support legs, a further hinge body interconnecting the two further support legs, and a further support device mounted or mountable on the further hinge body, and further comprising a left-hand connection hinge body pivotably engaging one of the support legs with one of the further support legs, and a right-hand connection hinge body pivotably engaging the other of the support legs with the other of the further support legs.

18. A shooting support as claimed in claim 17, wherein the left-and right-hand connection hinge bodies are articulable in respective connection hinge planes to permit a pivoting motion between the respective support leg and further support leg in said connection hinge planes, and the left-and right-hand connection hinge bodies being further articulable to permit movement of a ground-contact portion of the left-and right-hand connection hinge bodies relative to the respective support leg and further support leg.

19. A shooting support as claimed in claim 18, wherein the hinge body, the further hinge body, the left-hand connection hinge body, and the right-hand connection hinge body are independently articulable from one another.

* * * * *